Figure 1:
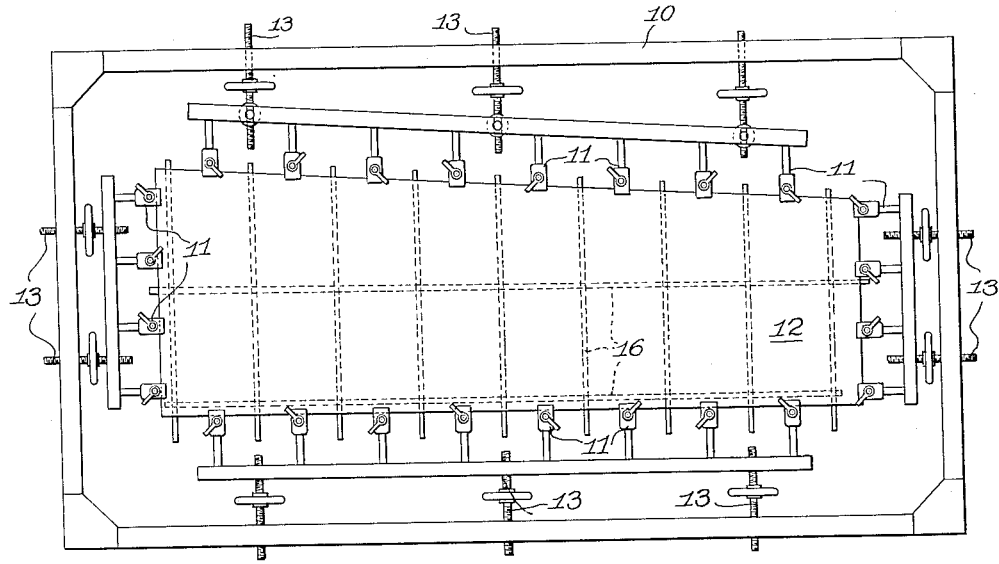

Feb. 15, 1944.   M. WATTER   2,342,025
METHOD OF APPLYING METALLIC SKIN COVERINGS TO AIRFOILS OR THE LIKE
Filed May 8, 1941

INVENTOR
*Michael Watter*

BY *John P. Tarbox*
ATTORNEY

Patented Feb. 15, 1944

2,342,025

UNITED STATES PATENT OFFICE 2,342,025

METHOD OF APPLYING METALLIC SKIN COVERINGS TO AIRFOILS OR THE LIKE

Michael Watter, Philadelphia, Pa., assignor to Edward G. Budd Manufacturing Company, Philadelphia, Pa., a corporation of Pennsylvania Application May 8, 1941, Serial No. 392,511

3 Claims. (Cl. 29—84)

This invention relates to those methods of application of stressed metallic skin coverings for airfoils which have for their outstanding object the most efficient utilization of the strength of the skin as against the development of forces in the skin from those multitudinous directions in which forces unavoidably develop. Such skins are subjected to forces developed in multitudinous directions for the simple reason that there are superimposed over the forces developed within the structure of the wing in their changing directions with changes in the degree of the structural loading of the wing incident to its cantilever support from the body of the aircraft, forces of the direct application of the load itself through the reactions of the skin surface with the atmosphere through which the wing is passing. In a fabric wing covering the fabric which constitutes the skin is put on loose and is thereafter stretched in a manner to afford tension in multitudes of directions in a region lying intermediate points of attachment of a given area, by means of coating compounds which shrink the fabric and cause it to draw drum-tight from regional boundaries of attachment.

In the attachment of metallic skins, such as relatively thin skins of duralumin and stainless steel, there are not utilized shrinking compounds. Instead the metallic coverings which cannot be thus shrunk, are attached ordinarily by rivets, screws, various clip arrangements, and in the instance of stainless steel by electric welding. These modes of attachment themselves, as welding for instance, oftentimes induce unwonted strains through the forces utilized at the time of attachment or developed by the attachment, and moreover, so far as I am aware, no means of attachment has been developed in which fullest stretching in all directions in the plane of the skin such as obtains in the case of fabric coverings treated by shrinking compounds, can be obtained in metallic skins. The nearest approach to this has been a longitudinal tensioning of the metallic skin sheets, tensioning in direction of one dimension only, at the time of application of the skin sheet. This has been partially successful, especially as applied to skins of stainless steel attached by electric welding. The results have been markedly improved by the imposition of peening upon welding, this peening relieving the localized irregular strains brought about by the heat of the weld and such metal distortions as are produced through the welding operation.

It is the object of my invention to produce in a metallic skin covering for airfoils, a tensioning of the same order as is produced in fabric skin covering treated by shrinking compounds.

Figure 2:
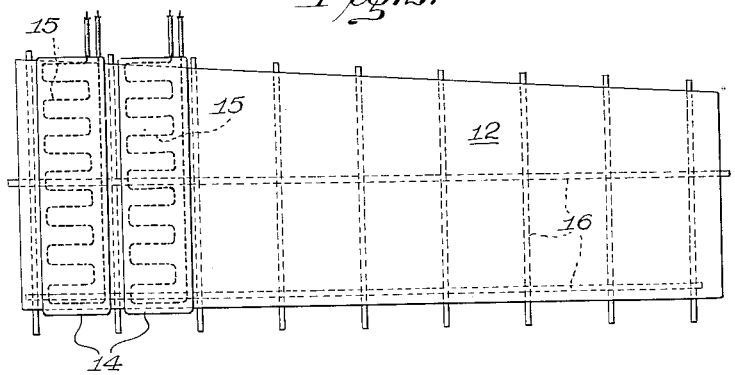

The objects and advantages of the invention will be apparent from the following description, reference being made to the accompanying drawing, wherein:

Fig. 1 is a plan view of apparatus for mechanically stretching the skin sheet; and Fig. 2 is a plan view of apparatus for thermally extending the skin sheet.

I attain the object of my invention by a number of methods, two outstanding of which I shall describe here. The first one is mechanical, in which at the time of application instead of stretching the skin sheet in the direction of one of its dimensions only, I stretch it simultaneously in a multitude of directions ranging around a 360-degree circle in such a manner that at the time of application, it is under a tension in all directions in the plane of the sheet.

According to another and preferred method of my invention, I apply the sheet under a relatively high temperature, such that the entire sheet is thermally expanded instead of being mechanically stretched at the time of application. When such a thermally expanded sheet is secured in position and its temperature again becomes normal, it is tension-stressed just as was the mechanically tension-stressed sheet, so stressed before application and securement. The degree of heat applied is very substantially beyond that degree encountered in the assembly room or in the normal use of the structure.

The means of carrying out the two embodiments of my invention are quite different, although the method itself is basically one and the same. In the instance of the mechanically developed tension-stressing, I utilize a perimetrally closed frame 10 having at its perimeter at various points means 11 for gripping the sheet 12, and through the gripping means 11 and any suitable means such as screw devices 13, applying strains in directions at angles to each other distributed at a multiple number of points around the closed perimeter of the frame, such as illustrated in Figure 1. The sheets so drum-tight stretched in all directions are thereupon secured in place in a tension-stressed condition. Securing is intended by welding.

To carry out the second embodiment of my invention I utilize as shown in Figure 2 flexible heating pads 14 of asbestos containing resistance heating elements 15 capable of heating the sheet to expand it to that degree which after its securement while so heated and subsequent cooling, will develop the degree of tension in all directions which I desire. I conceive that the application of temperatures above 150 degrees Fahrenheit will be ample for this purpose and contemplate using temperatures anywhere within this range and within that time limit of application which will not destroy the degree of cold work strength which is desired to be possessed by the sheet at the time the structure is completed. My concept is that while these skin sheets are normally of a high pre-cold worked strength they may be heated for brief intervals of time requisite for their application, without destroying this strength, and to this end the maximum temperature utilized must be adjusted to the time which the operation of welding the sheet requires. The wing framing is indicated by the numeral 16 in the views and it is obvious that the skin sheet 12 is welded to the framing 16 while the skin sheet is stressed in the manner set forth. If desired, particularly in the case of heating, only portions of the skin sheet may be heated and secured at one time by progressively working from one end of the wing to the other.

It is obvious that other methods of heating may be employed. One such method, for example, is concentrating a plurality of heat rays from a multiplicity of sources on the skin sheet, thus obviating devices which might interfere with the welding operations.

While I have described but two embodiments of my invention, I desire to have it understood clearly that there should be comprehended within the ambit of the annexed claims many other embodiments, for the generic spirit of my invention is far-reaching and is indeed independent of the specific terminology which I have utilized in the claims.

Thus, for example, I conceive that my invention has application to airfoils of every description and indeed to coverings for strained structures of every description. Likewise, my invention is applicable to all skin coverings of metal. Steps of my invention may be carried out by many different means besides those which I have described and illustrated. The order of the steps may be varied, too, without departing from the spirit of my invention.

What is claimed is:

1. The method of applying a metallic skin sheet having freely-extending margins to a framework, such as an airfoil framework, which consists in the following steps: (1) before the sheet is secured to the framework at all, expanding the sheet in substantially all directions from predetermined normal dimensions to dimensions substantially greater than those which it shall ultimately have been secured to the framework, (2) while the sheet is so expanded and in such juxtaposition to the framework as to enable it to be secured thereto, securing the sheet to the framework throughout the margins of an extended area, and (3) thereupon permitting the sheet to return toward its predetermined normal dimensions whereby the framework retains that portion of the sheet which lies within the secured margins in tension-stressed condition.

2. The method of applying a metallic skin sheet having freely-extending margins to a framework such as an airfoil framework, which consists in the following steps; (1) before the sheet is secured to the framework at all, expanding the sheet by mechanically tension-stressing it in substantially all directions from predetermined normal dimensions to dimensions substantially greater than those which it shall ultimately have when secured to the framework, (2) while the sheet is so expanded and in such juxtaposition to the framework as to enable it to be secured thereto, securing the sheet to the framework throughout the margins of an extended area, and (3) thereupon releasing the tension-stressing means and permitting the sheet to return toward predetermined normal dimensions, whereby the framework retains that portion of the sheet within the secured margins in tension-stressed condition.

3. The method applying a metalic skin sheet having freely-extending margins to a framework, such as an airfoil framework, which consists in the following steps; (1) before the sheet is secured to the framework at all, thermally expanding the sheet in substantially all directions from predetermined normal dimensions to dimensions substantially greater than those which it shall ultimately have when secured to the framework, (2) while the sheet is so expanded and in such juxtaposition to the framework as to enable it to be secured thereto securing the sheet to the framework throughout the margins of an extended area and (3) thereupon allowing the skin sheet to cool and contract toward its predetermined normal dimensions, whereby the framework retains that portion of the sheet which lies within the secured margins in a tension-stressed condition.

MICHAEL WATTER.